United States Patent [19]
Melton

[11] 3,895,466
[45] July 22, 1975

[54] SEWER LINE BLOW-OUT PLUG

[75] Inventor: Max Ray Melton, Henderson, Tenn.

[73] Assignee: M. M. S., Inc., Memphis, Tenn.

[22] Filed: May 21, 1974

[21] Appl. No.: 472,063

[52] U.S. Cl. .................... 52/169; 138/89; 220/234; 220/358; 277/165
[51] Int. Cl. ........................ E02d 27/00; F16l 55/12
[58] Field of Search ....... 138/89; 215/362; 220/203, 220/209, 233–234, 237, 358, DIG. 19; 89/30, 31; 42/1 N, 1 LP; 277/165

[56] References Cited
UNITED STATES PATENTS

| 3,338,499 | 8/1967 | Gilbert | 138/89 X |
| 3,414,158 | 12/1968 | Hunckler et al. | 220/234 X |
| 3,675,685 | 7/1972 | Potter | 220/358 X |
| 3,814,136 | 6/1974 | Johnson et al. | 220/358 X |

Primary Examiner—John W. Huckert
Assistant Examiner—Charles Gorenstein
Attorney, Agent, or Firm—Cushman, Darby & Cushman

[57] ABSTRACT

A reusable blow-out plug assembly for a pipe system, especially a sewer line. The blow-out plug assembly comprises two plates with a heavy jell-like material—such as wax—therebetween inserted into an open-pipe end of a cleanout for a sewer line. The plug effectively seals under normal conditions, but blows out with slight overpressure in the system.

10 Claims, 2 Drawing Figures 3,895,466

SEWER LINE BLOW-OUT PLUG

BACKGROUND AND SUMMARY OF THE INVENTION

The present invention relates to blow-out plugs, especially for sewer lines. It is known in the art to provide a blow-out plug for a sewer line (see U.S. Pat. No. 2,990,845) in addition to the normal securely engaged clean-out plug (such as shown in U.S. Pat. Nos. 3,291,156 and 3,749,131); however, such plugs have not been entirely satisfactory. According to the teachings of the present invention, a reusable blow-out plug for a pipe system, especially a sewer line, is provided. The plug may be used in place of a conventional clean-out plug in a sewer line—such plugs are conventionally located at a pipe clean-out outside of the building serviced by the sewer line—or in addition thereto. The plug assembly according to the teachings of the present invention is reusable, and easy to manufacture and install at relatively low cost—yet it blows out when the sewer line which it normally seals is clogged and subjected to overpressure. By blowing out, it ensures that instead of the building flooding, the fluid within the sewer line will overflow outside the building.

According to the teachings of the present invention, a sewer line plug is formed of two plates with a jell-like material, such as wax, therebetween. The jell-like material extends slightly around the edges of the plates to engage the interior of the sewer pipe into which it is inserted, and effectively prevents passage of any fluid into the pipe or sewer gas escaping from the pipe around the plates. Although the seal is effective under normal conditions, any significant pressure—such as the flushing of one commode once the line is filled—results in the plug being blown out of the pipe, and unrestricted flow of fluid therethrough is permitted.

It is an object of the present invention to provide an improved pipe plug that effectively seals a pipe end of a sewer clean-out during normal conditions but releases in response to small overpressures.

It is a further object of the present invention to provide a reusable plug in a sewer line which effectively prevents flooding within a dwelling with which the sewer line is connected.

These and other objects of the invention will become clear from an inspection of the detailed description of the invention and from the appended claims.

DETAILED DESCRIPTION OF THE INVENTION

Figure 1:
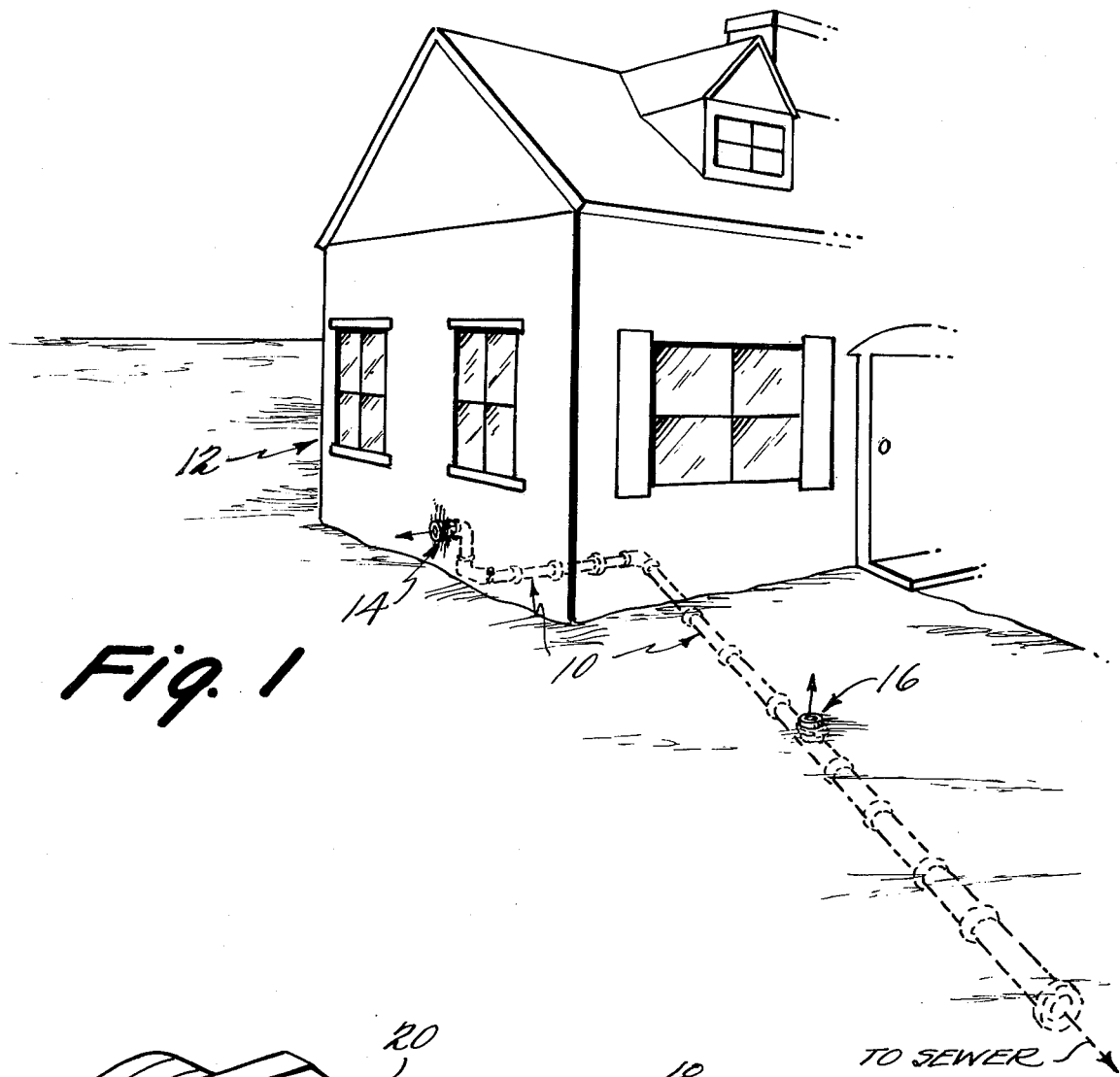
FIG. 1 is a diagrammatic view of a sewer line for a building employing a blow-out plug according to the teachings of the present invention.

A conventional sewer line 10 for a building 12 is shown diagrammatically in FIG. 1. The sewer line leads to the city sewer system, and may have incorporated therein a clean-out or clean-outs such as shown at 14 and 16. The clean-outs 14 and 16 are located outside the building 12 or under the house or any other location except in a basement and may be provided for clean-out of the sewer line, or they may be provided exclusively for flood protection or other sewer line backup protection. The clean-outs 14 and/or 16 may be provided at any location outside of the building 12 as long as they perform their functions of preventing flooding of fluid from the sewer line 10 into the building. It may be desireable to locate a clean-out, such as 16, near a public sewer so that any damage that might result from flooding outside the building 12 would be minimized.

Figure 2:
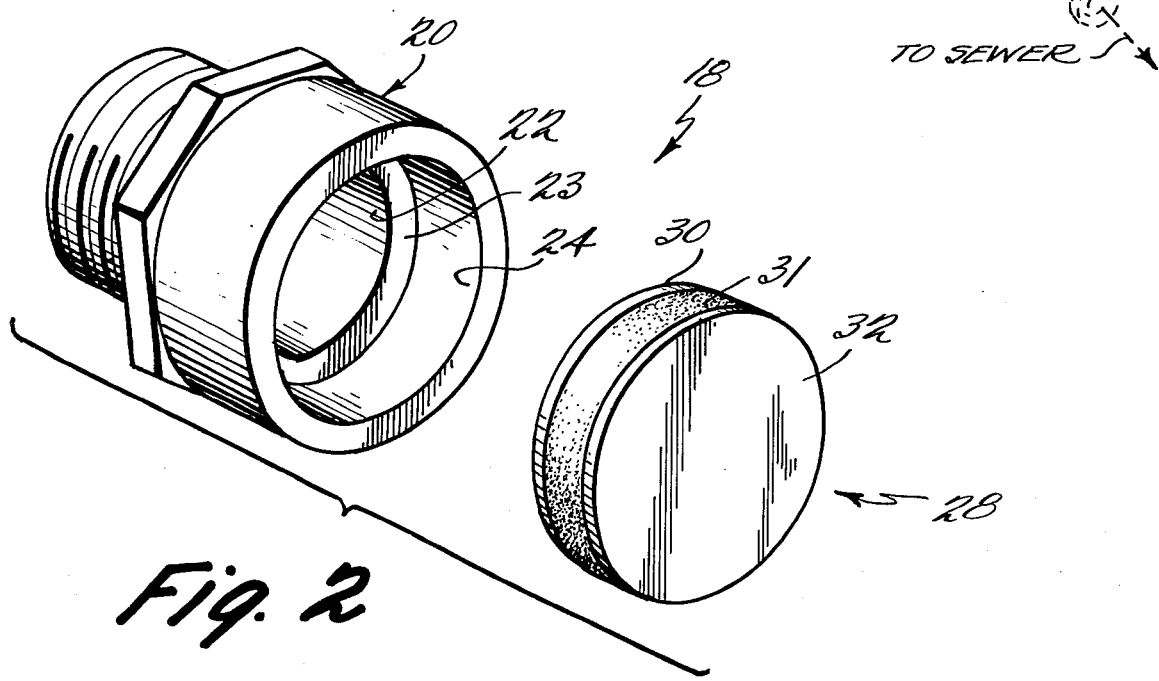
FIG. 2 is an exploded perspective view of an exemplary pipe-end and blow-out plug according to the teachings of the present invention.

A blow-out plug assembly according to the teachings of the present invention that may be used in sewer line clean-outs, such as 14 and 16, is shown generally at 18 in FIG. 2. The plug assembly consists of a pipe end 20 which may be a termination of an elongated pipe, or may be a screw-threaded coupling—as shown—for easy installation into already existing facilities. Preferably, the pipe end 20 has a relatively small diameter inside surface 22 communicating with the sewer line 10 and a relatively large diameter inside surface 24 spaced therefrom for receiving a blow-out plug 28, with a shoulder 23 therebetween.

The shoulder 23 provides a stop for the plug 28 received by the pipe end 20. The plug 28 comprises two plates 30, 32 formed of any suitable material such as metal or hard plastic, with a viscous jell-like material such as wax 31 therebetween. Each plat 30, 32 has a diameter that is preferably slightly less than the diameter of the surface 24 which receives it. The plate 30 abuts the shoulder 23 for limiting the inward movement of the plug 28 when it is being inserted into the pipe end 20.

The jell-like material or wax 31 incorporated between the plates 30, 32 is preferably a heavy wax, but other jell-like materials are suitable so long as they maintain their properties over a wide range of temperatures and stable properties extending over a substantial period of time are not soluble in water, are relatively viscous, will prevent the plug from coming out except upon overpressure, and preferably are easily obtainable. The volume of material 31 between the plates 30, 32 is such that it extends outside the region encompased by the area of the plates so that it engages and adheres to the inside surface 24. It is desirable to merely place a large volume of material 31 between the plates 30, 32, and then insert the whole plug 28 into the pipe end 20 and press on plate 32 even after plate 30 has engaged shoulder 23, thereby extruding the material 31 outside the area encompassed by the plates 30,32 into engagement with the surface 24. If the plug is ever blown out, it may be reused by merely repeating the above procedure.

It will be seen that the plug according to the teachings of the present invention effectively prevents sewer gas escapting the clean-out pipe and prevents water seepage into and around the plates 30, 32. However, the forces of adhesion between the material 31 and the surface 24 are small enough that once the sewer system or the pipe system capped by the assembly 18 is full, just a small amount of pressure—such as just the amount exerted by the flushing of just one commode—is enough to force the plug 28 out of its seating within the pipe end 20, and thus allow the fluid within the line 10 to exit through the pipe end 20. It will also be seen that the device according to the teachings of the present invention is reusable. It is easy to manufacture. The materials are readily available. It is easily installable within existing facilities in place of or in addition to normal closure plugs, and it effectively achieves the objects of the invention.

It will be apparent to one of ordinary skill in the art that modifications of the device according to the teachings of the present invention are possible. For instance, while the present invention is especially adapted for use in a sewer line system, it may be used with other fluid systems where over-pressure release is desirable. Also, the individual elements may take any desirable shape as long as their functions are performed. Many other modifications are also possible; thus, although the invention has been herein shown in what is presently conceived to be the most practical and preferred embodiment, it is recognized that departure may be made therefrom within the scope of the invention, which scope is not to be limited except by the appended claims.

What is claimed is:

1. A blow-out plug assembly for sealing a clean-out end of a pipe or a pipe system under normal conditions but blowing out when subjected to slight over-pressure within said pipe system, said assembly comprising
   a. first and second plates for reception within the open end of a clean-out pipe and
   b. A jell-like material sandwiched between said first and second plates, said jell-like material being extrudable to engage the interior surface of the pipe and hold said assembly within the pipe under normal conditions.

2. An assembly as recited in claim 1 wherein said jell-like material is wax.

3. An assembly as recited in claim 1 wherein said assembly is insertable in an open clean-out pipe end of a sewer line for a building, said open pipe end located outside said building, said assembly preventing flooding of said building as a result of clogging and backing up of said sewer line.

4. A blow-out plug assembly for sealing an open end of a pipe of a pipe system under normal conditions but blowing out when subjected to slight over-pressure from within said pipe system, said assembly comprising
   a. a pipe having an open end for receiving said assembly, said pipe having an interior surface thereof,
   b. first and second plates for reception within said open end of said pipe, said plates having a slight clearance between the edges thereof and the inside surface of said pipe, and
   c. a jell-like material sandwiched between said first and second plates, said material being extrudable between said plates to engage said interior surface of said pipe end and hold said assembly within the pipe under normal conditions.

5. A blow-out plug assembly as recited in claim 4 wherein said pipe end further includes stop means within said pipe for limiting the movement of said plates into said open pipe end and thereby locating said assembly within said pipe end.

6. An assembly as recited in claim 5 wherein said stop means comprises a shoulder within said pipe spaced from the open end thereof.

7. An assembly as recited in claim 4 wherein said jell-like material is wax or similar material.

8. An assembly as recited in claim 4 wherein said pipe is part of a sewer line for a building, said open end of said pipe being located outside said building and said assembly preventing flooding of said building as a result of clogging and backing up of said sewer line.

9. A method of sealing an open end of a pipe of a pipe system with a sealing means to provide for release of said sealing means as a result of over-pressure within said pipe system, said method comprising the steps of
   a. placing a volume of an extrudable jell-like material such as wax between two plates to form a blow-out plug assembly,
   b. inserting said assembly into the open end of a pipe having slightly greater cross-sectional dimensions than said plates and having stop means located therein spaced from said open end,
   c. pressing said assembly into said pipe open end so that one of said plates engages said stop means, and
   d. continuing to apply a pressing force to said assembly after said one plate thereof is stopped by said stop means to thereby partially extrude said material from between said plates into engagement with the interior surface of said pipe.

10. A method as recited in claim 9 comprising the further step of reinserting said assembly into said pipe once it is blown out by said pipe.

* * * * *